April 28, 1936.  L. J. SAUER  2,038,607
MEANS AND METHOD FOR MANUFACTURING DUPLICATOR SHEETS
Filed Oct. 9, 1931  8 Sheets-Sheet 1

Inventor:
Louis J. Sauer
By
Jones, Addington, Ames & Seibold
Attorneys.

April 28, 1936. L. J. SAUER 2,038,607
MEANS AND METHOD FOR MANUFACTURING DUPLICATOR SHEETS
Filed Oct. 9, 1931 8 Sheets-Sheet 3

Inventor:
Louis J. Sauer
By
Jones, Addington, Ames & Seibold
Attorneys.

April 28, 1936. L. J. SAUER 2,038,607
MEANS AND METHOD FOR MANUFACTURING DUPLICATOR SHEETS
Filed Oct. 9, 1931 8 Sheets-Sheet 4

Inventor:
Louis J. Sauer
By
Jones, Addington Ames & Seibold
Attorneys.

April 28, 1936. L. J. SAUER 2,038,607
MEANS AND METHOD FOR MANUFACTURING DUPLICATOR SHEETS
Filed Oct. 9, 1931 8 Sheets-Sheet 5

Inventor:
Louis J. Sauer
By
Jones, Addington, Ames & Seibold
Attorneys.

April 28, 1936.   L. J. SAUER   2,038,607
MEANS AND METHOD FOR MANUFACTURING DUPLICATOR SHEETS
Filed Oct. 9, 1931   8 Sheets-Sheet 7

Fig. 18.

Inventor:
Louis J. Sauer
By
Jones, Addington, Ames & Seibold
Attorneys.

Inventor:
Louis J. Sauer
By
Jones, Addington, Ames & Seibold
Attorneys.

Patented Apr. 28, 1936

2,038,607

UNITED STATES PATENT OFFICE 2,038,607

MEANS AND METHOD FOR MANUFACTURING DUPLICATOR SHEETS

Louis J. Sauer, Oak Park, Ill., assignor, by mesne assignments, to Ditto, Incorporated, a corporation of West Virginia Application October 9, 1931, Serial No. 567,871

14 Claims. (Cl. 91—68)

My invention relates to means and method of manufacturing hectograph or duplicator sheets or strips which are commonly wound on suitable spindles and stretched over a printing bed for the purpose of making copies thereon from a suitable printed or written original.

While the means and method herein disclosed may be successfully used for various purposes such as manufacturing photographic film or other sheets having a gelatine-like coating on at least one side, it is especially adapted for use in practising a process similar to that described and claimed in the application of Carl S. Miner, Serial No. 540,514, filed May 27, 1931, for Duplicating sheets.

The duplicator sheets commonly comprise a duplicating composition consisting substantially of glue, glycerine and water attached to a backing of treated paper, the paper being treated with a suitable lacquer. Heretofore it has been the custom to lacquer only one side of the paper and to apply the duplicating composition to the unlacquered side because of the difficulty of securing satisfactory adherence between the lacquered-surface of the paper and the duplicating composition. In the present invention, the paper is lacquered on both sides before putting the duplicating composition thereon which lacquering is a distinct advantage in preventing moisture and duplicating ink from penetrating into the paper and thereby increasing its tendency to deteriorate during long periods.

An object of this invention is to provide a means and method of applying duplicating materials of normal composition such as those containing glue, glycerine and water and causing the same to adhere firmly to the lacquered surface of any suitable backing such as paper, fibre, cloth, celluloid, etc.

In practising my invention it is desirable that the paper which is provided in rolls should run continuously through the machine and be processed, lacquered, trimmed, coated and dried in a continuous operation. I have, therefore, provided a suitable means and method for accomplishing all of the necessary operations and for producing a continuous duplicator strip, having a suitable duplicating composition thereon, which strip may be cut into suitable lengths for winding on duplicator machine spindles.

The means and method disclosed in the present application comprises running the strip of untreated backing material from a roll into the machine where it is first impregnated with a thin glue-glycerine-water solution, preferably also containing a germicide. The strip then passes through suitable pressure rolls for removing the surplus impregnating material and for smoothing the surface thereof. It is then heated by passing it over suitable heater rolls and then coated on both sides with lacquer by passing through a suitable tank. Ordinary, clear lacquers may be used or a special lacquer including cellulose nitrate or so-called "pyroxylin". The strip is then passed through drying ovens and then automatically trimmed to a desired width to fit the duplicating machines on which it is to be used.

A very thin layer of special adhesive composition which will adhere to the lacquer coating and also to a gelatine-glue duplicating composition to be applied later is then applied to only one side of the lacquer-coated backing. The adhesive is then dried and the duplicating composition applied to the adhesive coated side. The special adhesive preferably contains a solvent for the duplicating composition and a non-solvent wetting agent for the lacquer surface such as alcohol, together with a glue and plasticizer for glue such as Turkey red oil, glycerine or a glycol. The special adhesive used provides a binding agent which will adhere to the lacquer on the one hand and duplicating composition on the other. By this means the adherence between the lacquered surface of the paper and the duplicating composition which is applied thereon results in an extremely firm bond so that the duplicating composition is weaker than the bond between it and the lacquer. The strip is then passed over a drier which tends to dry out the solvents in the adhesive and retain the surface of the strip at approximately 140° F. The duplicating composition is then applied to the adhesive side of the lacquered strip by a novel means and method which results in the application of a coating of a desired uniform thickness. The temperature of the composition as applied should be slightly less than the surface to which it is applied. The strip and the composition thereon is then quickly cooled to a suitable temperature to provide a preliminary "set" of the composition and the strip is then carried on a suitable conveyor and cut into desired lengths.

In previous methods of applying the duplicating composition it has been impossible to prevent bubbles forming in the composition on the backing. It has therefore been necessary for employees to prick these bubbles after the paper has been coated and before the composition is completely set, and this has caused the surface of the composition to be rough and wavy.

It is an object of my invention to provide a novel means whereby the formation of bubbles on the paper strip has been entirely eliminated and whereby a uniform thickness and a degree of smoothness has been obtained which has previously been impossible.

It is also an object to provide a means for handling and processing a backing for duplicator strips which will effectively prevent buckling of the material after impregnation, and which will retain a smooth surface and an alignment of the material which will allow the finished duplicating surface to be smooth and without material variation in the thickness of the finished duplicator sheets.

I also provide a novel means for applying the duplicating composition whereby a constant pressure is maintained and the composition is applied smoothly and evenly and all bubbles are eliminated.

Automatic means is also provided whereby alternate portions only of the strip are coated with the duplicating composition and whereby the strips may be cut into lengths to provide a coated portion having an uncoated apron at each end for attachment to suitable spindles.

Further objects will be apparent from the specification and the appended claims.

In the drawings:

Fig. 8A is an enlarged detail section through the lacquer-smoothing rolls shown in Fig. 8, and illustrates the method of securing a smooth and even coat of lacquer on each side of the backing;

Figure 1:
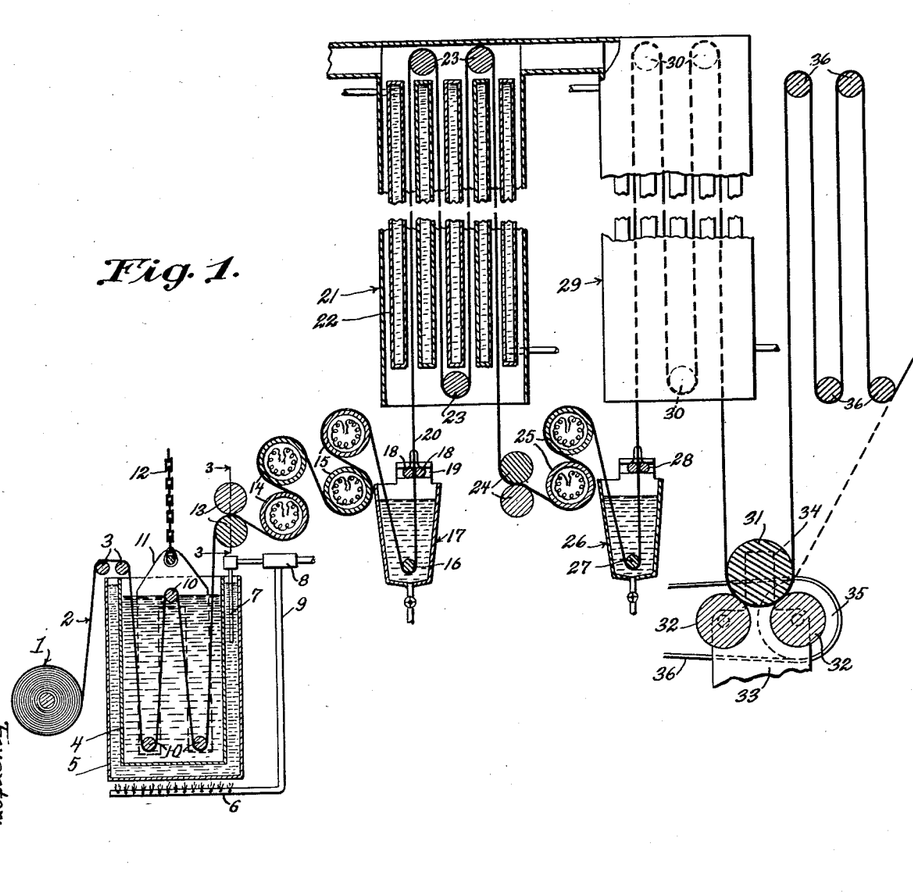
Figure 1 is a diagrammatic elevation partially in longitudinal section of the impregnating and lacquer applying portion of the device.
Figure 2:
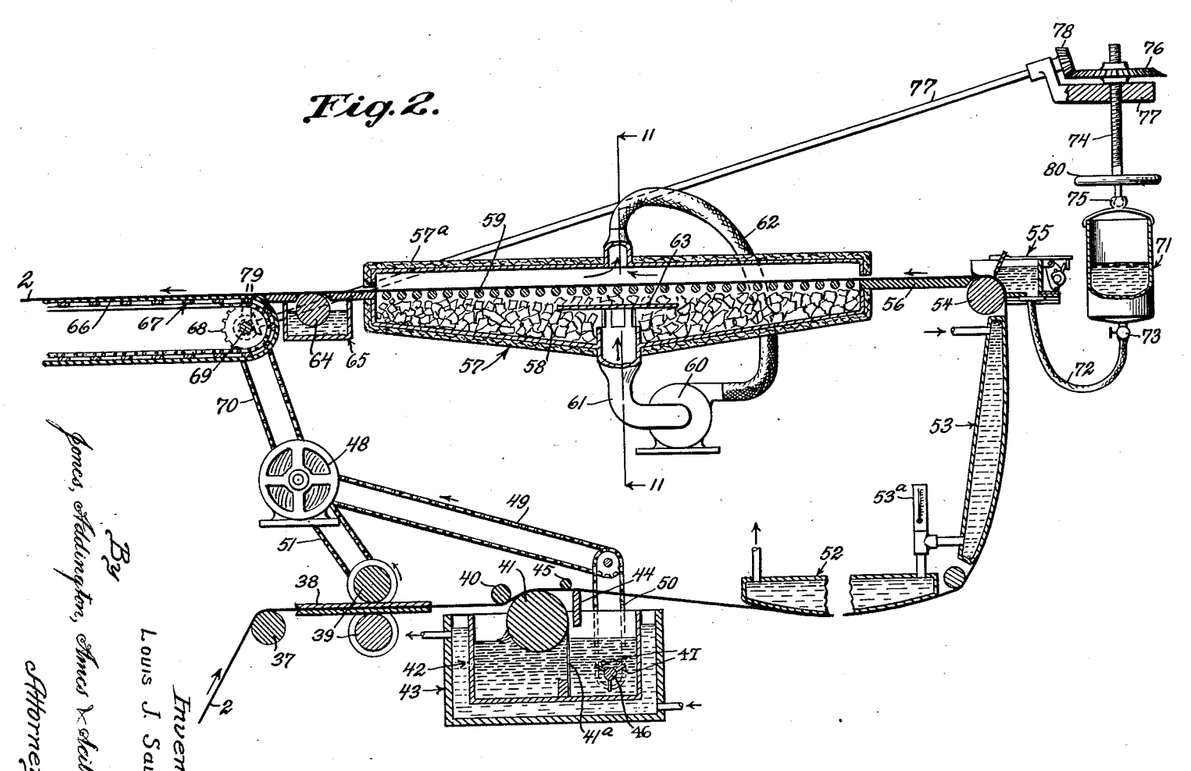
Fig. 2 is a diagrammatic elevation partially in longitudinal section of the adhesive and composition applying portion of the device.

Referring to the drawings in detail, Figures 1 and 2 illustrate in a somewhat diagrammatic manner a substantially longitudinal, vertical section through the entire machine and illustrates the path of a hectograph backing strip through the machine together with the various operations performed thereon. The machine, of course, includes a suitable frame structure and bearings and supports for the various parts, the frame and component parts thereof not being illustrated in these figures, as they may be of any suitable design.

In the present instance the intake end of the machine is shown as located below the discharge portion. It will be understood, however, that the machine may be built, if desired, to guide the backing completely through the machine in a substantially horizontal plane instead of reversing the direction as shown in the present instance.

In operation, a roll 1 of a suitable backing strip is mounted adjacent the intake end of the machine and the backing strip which is indicated by the heavy line 2 is passed over supporting rollers 3 and is then festooned in a tank 4 of impregnating material through which it moves continuously. As previously mentioned the backing strip 2 may be of any suitable material but is usually made of paper and the impregnating material consists substantially of glue, glycerine and water retained at a temperature of approximately 140° F. by means of hot water in a tank 5 in which the impregnating tank 4 is supported. The water may be kept at a suitable temperature by means of a gas burner 6 which latter is automatically controlled by means of a thermostat 7 and a suitable thermostatically controlled valve 8 in the gas conduit 9.

The backing is festooned in the impregnating tank 4 by being passed around supporting rollers 10 which are mounted on a removable frame 11. This frame is suspended in the tank by means of a chain 12 and may be raised therefrom or lowered therein by any suitable hoisting means such as a pulley or tackle. The festooning arrangement in the bath is provided in order that the backing may be in the bath long enough to be thoroughly impregnated and to make the backing pliable and flexible and it is festooned over the several rollers in order to prevent buckling and to retain the backing in smooth and accurate alignment.

The backing then passes between a pair of pressure or squeeze rollers 13 for removing the surplus impregnating material and eliminating any bubbles which may have formed on the surface. These rollers 13 are accurately spaced and yieldably mounted in order to exert the exact desired pressure on the backing and to retain a uniform thickness thereof.

After passing through the squeeze rollers the backing is passed around a plurality of heating, drying and smoothing rollers 14 and 15. These latter rollers are accurately retained at desired temperatures, the rollers 15 being held at a somewhat higher temperature than the rollers 14, or, as is sometimes desirable, each successive roller may be maintained at a higher temperature than the preceding one. The backing passes from the heat rollers 15 around a roller 16 in a tank 17 containing a suitable lacquer. The progressively increasing heat of the rollers 14 and 15 as the backing passes thereover prevents the backing from collecting moisture before it enters the lacquer tank and maintains the material in a suitable condition to receive the lacquer.

The backing passes from the lacquer tank 17 upwardly between a pair of floating rollers 18 which are supported in horizontal slots 19 adjacent the top of the lacquer tank. These rollers are retained in engagement with the backing by means of a spring 20. A detailed description of these rollers and their function will be given later.

A drying oven 21 is provided in which is supported a plurality of tanks 22 through which latter hot water is constantly circulated. This water is preferably heated sufficiently to maintain an oven temperature of approximately 200° F. The backing 2 as it passes from the lacquer tank is festooned in the drying oven and supported therein on rollers 23. The oven 21 is open at the bottom as shown in order to provide an air circulation for drawing off the volatiles. The backing then passes between another set of squeeze rollers 24 similar to the rollers 13, and then around another pair of heat rollers 25. These heat rollers 25 are similar to the rollers 14 and 15, and the oven 21 and the heat rollers 25 serve to maintain the desired temperature of the backing until the lacquer coating operation is completed.

The backing then passes through another lacquer tank 26 which is identical with the lacquer tank 16 and which also is provided with a roller 27 and the floating rollers 28 corresponding to the roller 16 and the floating rollers 18 respectively of the lacquer tank 17. The backing then passes through another drying oven 29 which is in all respects similar to the oven 21 and in which the backing is supported on suitable rollers 30.

In order to maintain tension on the backing as it passes through the mechanism just described it is passed under a comparatively heavy roller 31 which is supported on rollers 32 mounted in suitable bearings on frame members 33. The roller 31 is not provided with a bearing but is retained in alignment by means of upright frame portions 34 adjacent the ends of the roller. The rollers 32 are driven from any suitable power source by means of a pulley 35 and a belt 36.

The backing is then air-dried by being festooned over rollers 36 from which it passes upwardly and over a roller 37 (Fig. 2) and is guided by plates 38 between suitable trimming rollers 39. These trimming rollers are provided with suitable cutters arranged to trim the backing accurately to a desired width.

In certain applications of the device it is unnecessary to pass the backing through more than one lacquer bath and under such circumstances the backing may be passed directly from the drying oven 21 to the tension roller 31. Also in some cases, air-drying is unnecessary and therefore it is unnecessary to festoon over the rollers 36 and the backing may be passed directly from the tension roller 31 to the trimming rollers just described and as shown by the dotted line in Fig. 1.

As previously stated it has been the practice heretofore to apply the duplicating composition to the unlacquered side of the backing. In the present instance, however, the backing is completely lacquered on both sides and in order to prepare one side of this lacquered backing to receive and retain the duplicating composition the backing strip is passed from the trimming rollers 39, under a roller 40, and over the top of and in contact with a comparatively large adhesive applying roller 41. This roller 41 is supported and partially immersed in a special adhesive in a tank 42. The tank 42 is supported in a larger tank 43 and the space therebetween is filled with circulating hot water for maintaining the adhesive at a desired temperature. The backing passes from the adhesive applying roller 41 over a stationary doctor bar 44 for smoothing the adhesive and removing the surplus, and is retained evenly in contact therewith by means of a roller 45. A scraper 41a is mounted for engagement with the roller 41 for the purpose of cleaning the roller and keeping it in condition for applying the adhesive smoothly to the backing.

An agitator shaft 46 is supported in the adhesive tank 42 and provided with paddles 47. The agitator shaft is driven from a motor 48 by means of chains 49 and 50 on suitable sprockets. The trimmer rollers 39 are also driven from the motor 48 by means of a chain or belt 51. From the adhesive applying roller the backing strip passes around and in contact with suitable drying tanks 52 and 53. These tanks are retained at the desired temperature by means of circulating hot water therein.

It will be noted that the adhesive side of the backing is not in contact with the tanks and the strip passes upwardly around a roller 54 adjacent which is an automatic composition-applying device 55 for applying a suitable duplicating composition to the adhesive side of the backing.

It is desirable that the temperature of the surface of the backing should be approximately the same or slightly above the temperature of the composition to be applied thereto. In practise, a temperature of approximately 140° has been found to give satisfactory results. The temperature should be maintained only for a sufficient time before the composition is applied to dry the solvents but to leave the surface comparatively soft and sticky. It is usually desirable that the backing surface be somewhat higher in temperature than the temperature of the composition to be applied thereto.

The applying device 55 is arranged to automatically apply the composition in a manner to provide a coating of a desired thickness to spaced portions of the adhesive side of the backing strip.

Figure 20:
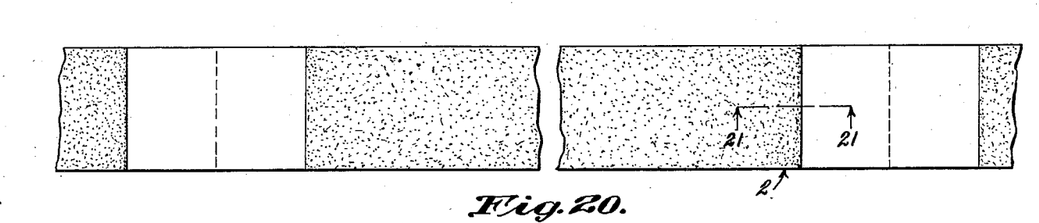
Fig. 20 is a fragmentary top plan view of the finished strip before being cut into lengths.
Figure 21:
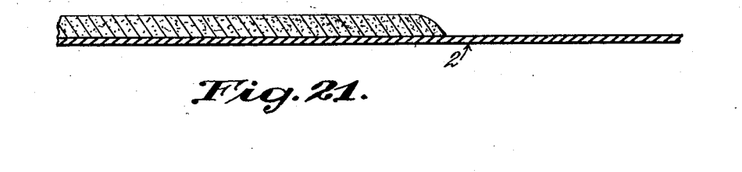
Fig. 21 is a section through the strip shown in Fig. 20 and taken on a line corresponding to line 21—21 of Fig. 20.

The composition is applied to the strip as indicated in Figs. 20 and 21, and the strip is cut through the uncoated portions into suitable lengths and the uncoated ends may then be used for securing the strip to suitable spindles for use in a standard duplicating machine. A detailed description of the component parts of the embodiment shown, including the composition applying device, will be given later.

The coated strip then passes from the composition applying device over a shelf 56 and through a cooling device 57 having a chamber 58 therein, in which is supported a series of rollers 59 on which latter the backing is supported. Ice may be used in the chamber 58 for cooling purposes or any other suitable means for maintaining a desired temperature, and a circulation of air is maintained through the chamber by a fan 60 which communicates with the chamber by means of a pipe 61 and a flexible conduit 62. The air circulation is in the direction of the arrows and a baffle plate 63 is provided for deflecting the air as it passes through the chamber.

The cooling chamber 57 is for the purpose of giving the duplicating composition a preliminary "set" and after passing through the cooling chamber the completed strip passes over a moistening device arranged to moisten the back of the strip and which comprises a roller 64 partially immersed in water in a suitable tank 65 located beneath the strip. The back of the strip is moistened for the purpose of causing it to adhere to a rubber belt 66 which latter is stretched snugly over and forms a part of a conveyor 67. The conveyor may be of any desired length and is supported on and driven from suitable sprockets 68. The sprockets are mounted on a shaft 69 which is driven from the motor 48 by means of a chain or belt 70. The moisture which has been applied to the under side of the coated strip causes the strip to adhere snugly to the rubber belt 66 and the strip will be thereby continuously carried from the machine and over the length of the conveyor. Automatic means, which will be described later, cooperate with this conveyor and with the composition applying device 55 for controlling the operation of coating and leaving alternate portions of the strip uncoated.

As the strip is carried along by the conveyor it may be cut into lengths as previously indicated and these sheets may be then laid on suitable screen trays and placed in a cooling chamber until the composition is permanently set when they are removed and wound on standard duplicator machine spindles.

It will be understood that a comparatively accurate temperature control of the backing strip and of the processing and coating materials is desirable and the desired temperatures may be maintained by suitable thermostatically controlled means. A thermometer 53a is arranged for indicating the temperature of the tanks 52 and 53 whereby an accurate check may be kept on the temperature at the time the strip enters the composition applying device.

It will be noted that the composition applying device 55 includes a chamber for receiving the duplicating material which is usually a gelatine glue composition and that the material is supplied to this chamber from an automatically adjustable tank 71 through a flexible hose 72 having a valve 73 therein.

The automatically adjustable tank 71 is for the purpose of maintaining a constant and uniform head of composition in the chamber of the applying device.

As the composition flows from the chamber of the applying device 55 on to the backing, the tank 71 is automatically raised, to maintain a constant level in the applying device, by means of a threaded shaft 74 to which the tank 71 is attached by a ball and socket joint 75. The shaft 74 is threaded into a bevel gear 76 which is supported for rotation on a frame member 77. The bevel gear 76 is driven from the conveyor shaft 69 by a suitable transmission comprising a shaft 77 having a bevel pinion 78 thereon in mesh with the gear 76, the shaft being operatively connected to the conveyor shaft by bevel gears 79. By means of this transmission the tank 71 will be automatically raised as the composition is removed from the chamber of the applying device and a substantially constant head may be maintained therein. Adjustment of the tank 71 to compensate for variations may be made when necessary by means of a hand wheel 80 on the threaded shaft 74.

A detailed description of the construction and operation of the component parts of the machine just described will now be given.

Figure 3:
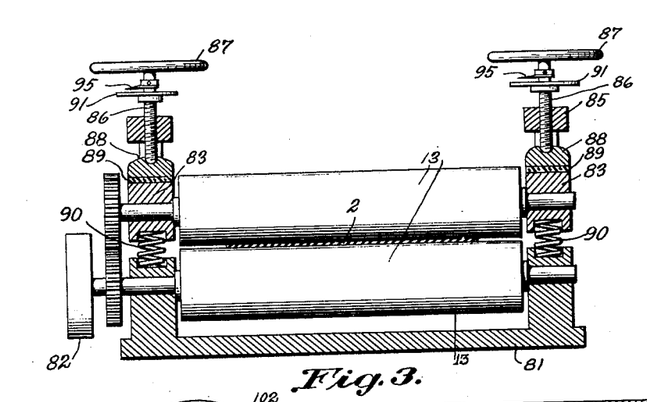
Fig. 3 is a front elevation of the pressure or so-called squeeze rolls and adjusting means and is shown partially in section on a line corresponding to line 3—3 of Fig. 1.
Figures 4, 5:
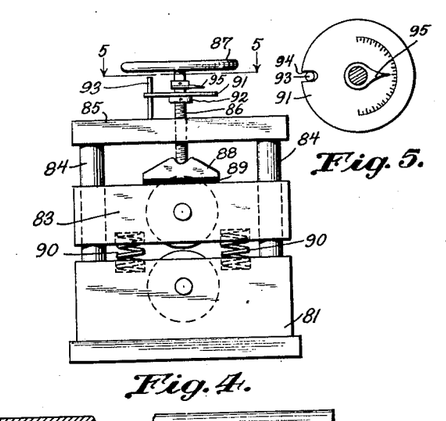
Fig. 4 is an end elevation of the squeeze roll device illustrated in Fig. 3.
Fig. 5 is a transverse detailed section of the squeeze roll adjusting means and taken on a line corresponding to the line 5—5 of Fig. 4.

The detailed construction of the pressure or squeeze rollers 13 and 24 is illustrated in Figs. 3, 4 and 5 in which the lower one of the rollers 13 is mounted in a suitable bearing and supporting member 81 and provided with a pulley 82 by which the rollers may be driven. The upper roller is mounted in bearings 83 which latter are slidably mounted on vertical rods 84. Cross bars 85 are secured to the top of the rods 84 and provided with threaded adjusting screws 86 each having a hand wheel 87 thereon. The threaded screws 86 are engaged with a bearing block 88 which is supported on a rubber shoe 89 interposed between the bearing block 88 and the slidable bearing 83. The rollers are operatively connected by means of suitable gears as shown, and may be adjusted to any desired spaced relation by means of the hand wheels 87 and will be maintained in any adjusted spaced relation by means of springs 90 interposed between the lower bearing member 81 and the slidable bearings 83.

It is desirable that the rollers be accurately spaced in order to maintain a desired pressure on the strip as it passes therebetween and for this purpose a dial 91 is loosely mounted on the shaft 86 and supported by a collar 92 secured to the shaft. The dial, therefore, will be raised and lowered with the shaft 86 and is prevented from rotation by means of a pin 93 engaging in a slot 94 in the dial. A pointer 95 is secured to the shaft whereby the hand wheel 87 may be operated to accurately space the rollers for a desired thickness of backing strip. The rubber shoe 89 is for the purpose of allowing the upper roller to give slightly in case of foreign material passing between the rollers or in case the strip is not uniform in thickness.

Figure 6:
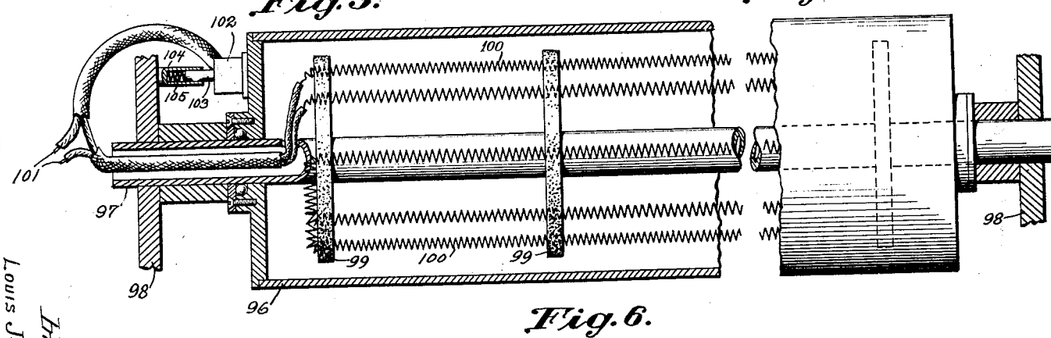
Fig. 6 is a side elevation partially in longitudinal section of one of the heater rolls and also illustrates the thermostatic control therefor.
Figures 7, 8, 9, 10, 11:
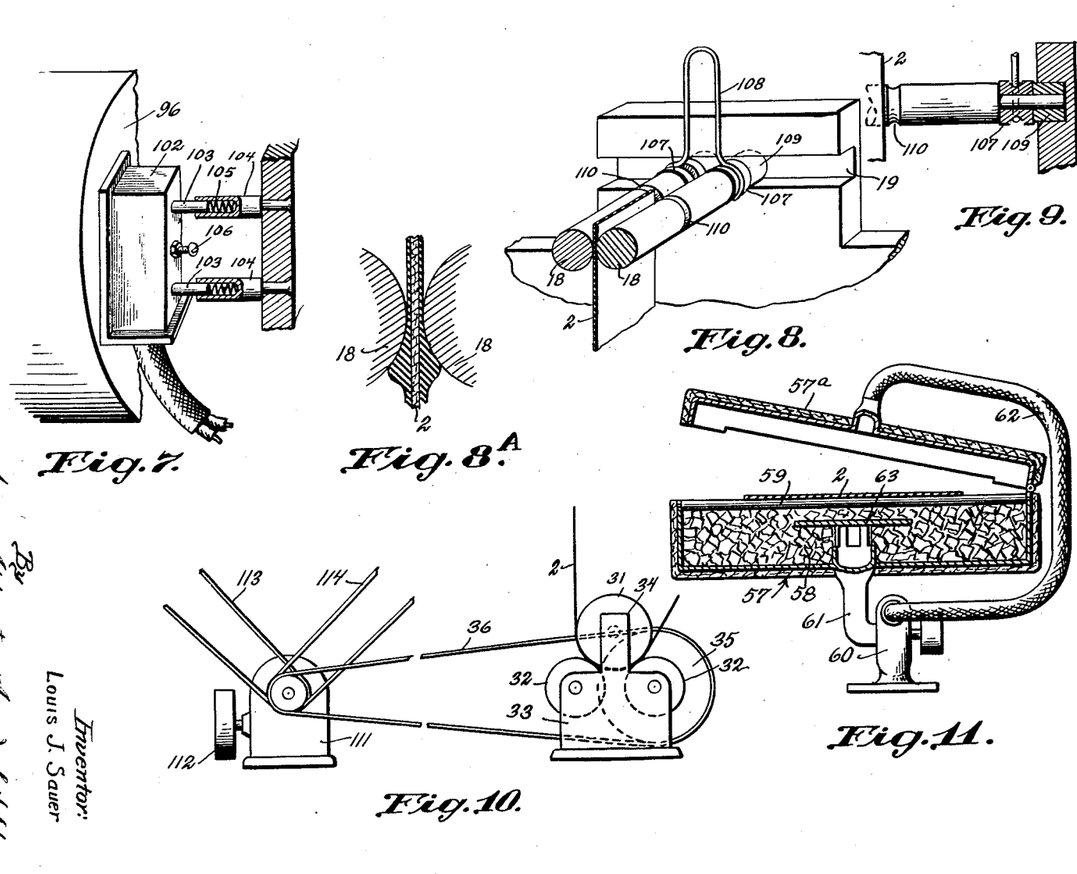
Fig. 7 is a detailed perspective view of one of the thermostats as applied to one of the heater rolls.
Fig. 8 is a detailed perspective view of the lacquer smoothing rolls and the bearing therefor.
Fig. 9 is a vertical longitudinal section taken through one of the lacquer roll bearings illustrated in Fig. 8.
Fig. 10 is a fragmentary diagrammatic view illustrating the method of driving the squeeze rolls and paper feeding rolls.
Fig. 11 is a transverse sectional view through the composition cooler illustrated in Fig. 2 and is taken on a line corresponding to line 11—11 of Fig. 2.

The heating rollers 14, 15 and 25 are identical in structure and are illustrated in detail in Figs. 6 and 7 and comprise a cylindrical member 96 supported by means of suitable bearings on a hollow shaft 97 which latter is rigidly supported in frame members 98. In order to maintain a desired uniform temperature on the surface of the heat rollers, insulating members 99 are mounted on the shaft 97 in spaced relation and a heating element 100 is mounted thereon and connected to suitable electrical conductors 101.

A thermostat switch 102 which may be of any of the usual make and break types is connected in series with one of the conductors 101. The switch 102 is supported in frictional engagement with the end of the heat roller as shown in Figs. 6 and 7, by means of posts 103 which are telescopically mounted in cooperating posts 104 supported on the frame members 98. Springs 105 retain the thermostat container 102 in frictional engagement with the roller.

A thermostat adjusting screw 106 is provided for cooperation with the thermostat in the usual manner whereby the thermostat may be adjusted to control the electrical circuit to maintain the roller at any desired temperature. The temperature of each roller may be maintained independently of all of the others and ordinarily it is desirable that each succeeding roller between the impregnating and lacquer bath be of somewhat higher temperature than the preceding one in order that the temperature of the backing may be progressively increased in its movement from the impregnating means to the lacquering means, thus preventing the backing from collecting any moisture before it passes into the lacquer.

As previously stated, the lacquer tank 17 is provided with the floating rollers 18 between which the backing 2 passes as it emerges from the lacquer bath. These rollers are illustrated in detail in Figs. 8, 8A and 9. The reduced ends of the rollers 18 are provided with spacing rollers 107 which are slightly larger in diameter than the rollers 18. These rollers 107 are provided with grooves arranged to receive a U-shaped spring 108 whereby they are held in engagement. The increased diameter of the rollers 107 maintains the rollers 18 in a spaced relation corresponding to the width of the backing and the desired thickness of lacquer to be applied on each side thereof. The reduced ends of the rollers 18 are also provided with bearing rollers 109 which are engaged in the horizontal bearing slots 19. By this arrangement the rollers 18 are supported in a substantially floating relation to the backing and as the backing 2 with its lacquer coating passes between the rollers as shown in Fig. 8A the spaced relation of the rollers and their floating relation relative to the backing causes the lacquer coating to be spread over the backing on each side with a uniform thickness, the surplus lacquer being squeezed from the backing and the coating smoothed and pressed in a uniform manner as illustrated.

In order to prevent the building up of lacquer along the edges of the backing strip, grooves 110 are provided in the rollers 18 adjacent the edges of the backing strip. This allows the lacquer to flow away from the edges of the backing strip and prevents a thickening of the lacquer at this point.

Fig. 10 is a diagrammatic view illustrating the means for driving the squeeze rollers and tension roller device illustrated in Fig. 1 and comprises a speed reduction device 111 which may be of any ordinary type, preferably a worm and worm wheel, and may be driven from any suitable source by means of a pulley 112. The squeeze rollers 13 and 24 are driven from this speed reduction device by means of belts 113 and 114 respectively which are arranged to drive the pulleys 82 on the squeeze rollers. The tension rollers are driven by means of the belt 36 on the pulley 35. After the composition has been applied to the backing it passes through the cooler 58 for the purpose of receiving a preliminary "set".

A suitable cooler is provided for bringing the composition to a desired temperature, and in the embodiment illustrated, the cover 57a (Fig. 11) is hinged as shown to allow the insertion and inspection of the duplicator strip. The fan 60 may be operated from any suitable power source.

It is desirable that the duplicating composition, which is maintained at a desired temperature, be applied to the lacquered surface of the backing as it passes from the surface of the heating tanks 52 and 53 to the preliminary cooling device, and that a desired thickness of the composition be evenly and smoothly applied with a uniform pressure with the surface smooth and free from bubbles. In order to accomplish the desired result I provide a novel composition-applying device which is illustrated in detail in Figs. 12 to 17 inclusive.

Figures 12, 12A, 13:
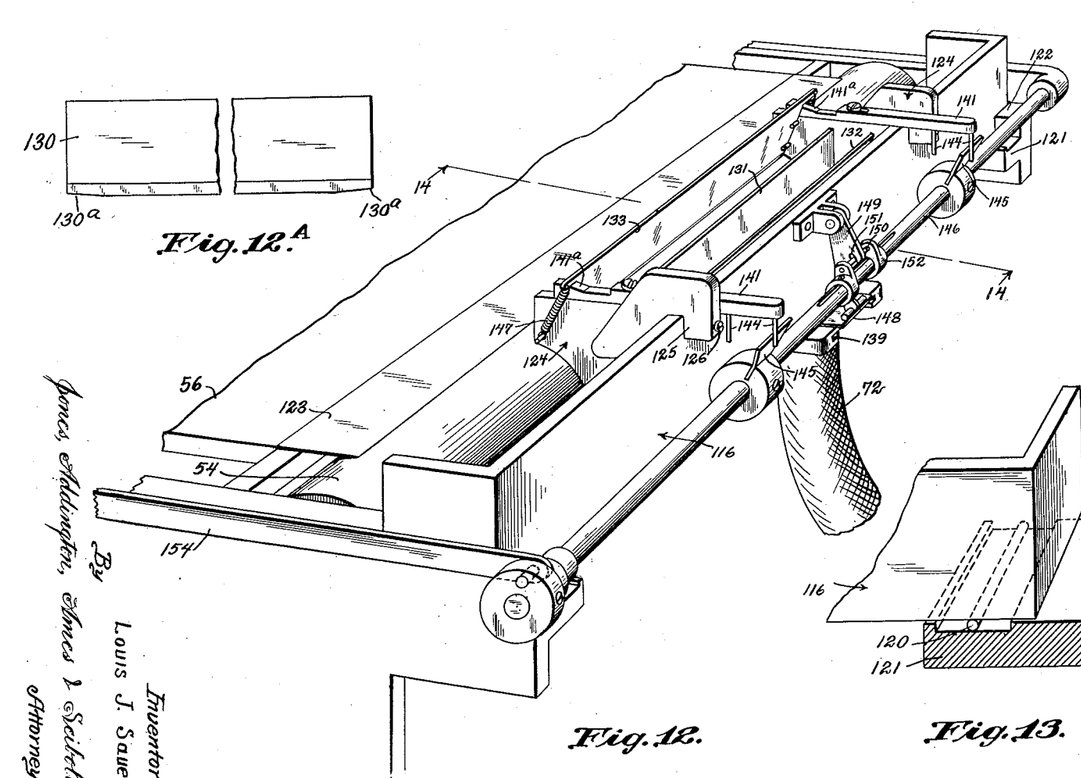
Fig. 12 is a perspective view of the composition applying portion of the device.
Fig. 12A is an elevation of the composition applying doctor bar shown in Fig. 12.
Fig. 13 is a detailed perspective view of the floating mounting means provided for the composition reservoir and applying means.
Figures 14, 15, 16, 17:
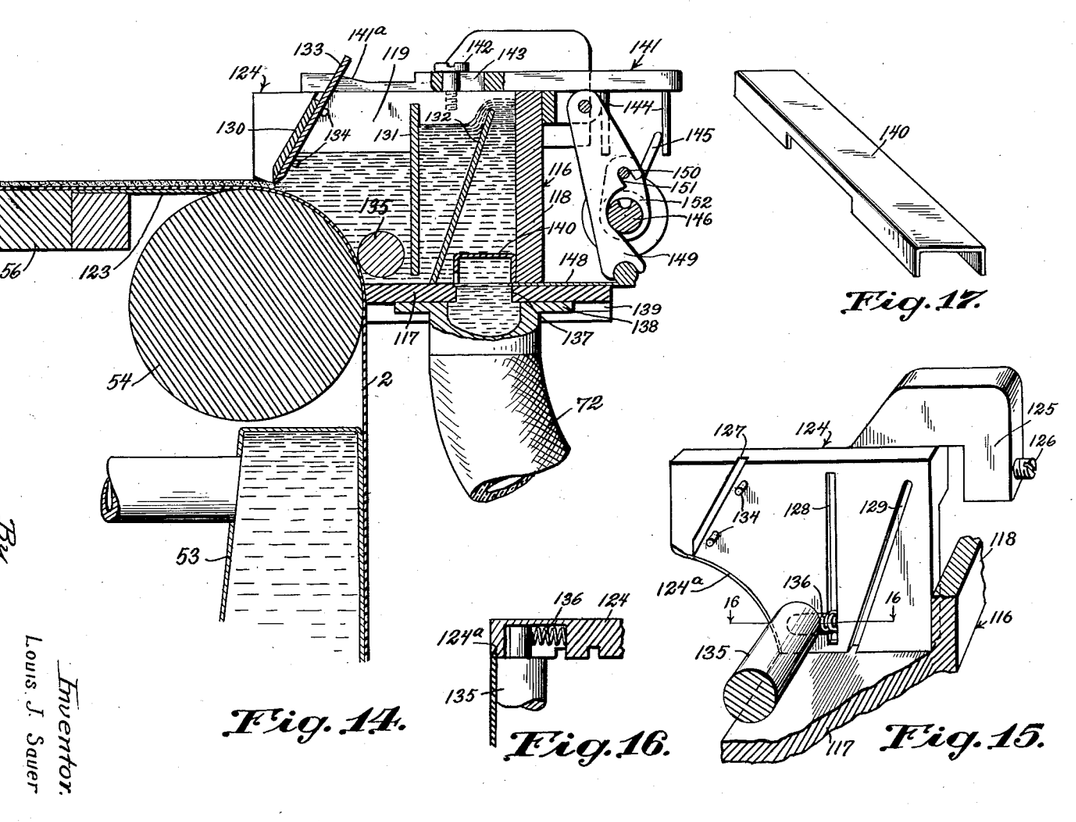
Fig. 14 is a transverse sectional view through the composition applying device and reservoir and taken on a line corresponding to line 14—14 of Fig. 12.
Fig. 15 is a detailed perspective view of one of the movable side walls of the composition applying reservoir.
Fig. 16 is a transverse sectional view taken on a line corresponding to the line 16—16 of Fig. 15, and illustrates the mounting means for the composition applying roller.
Fig. 17 is a detailed perspective view of the composition distributing means whereby a substantially even flow of composition into the reservoir is obtained.

The composition applying device which is indicated by the reference character 55 in Fig. 2 comprises a floating elongated member 116 which is L-shaped in cross section as shown in Fig. 14 and which includes a bottom 117 and a back wall 118 for a composition chamber 119. This member 116 is supported at each end for longitudinal movement on rollers 120 which are in turn supported on brackets 121 forming a part of the side frames of the machine. The supporting means is identical on each side frame and is illustrated in Fig. 13. The supporting roller bearing allows the member 116 to move longitudinally to conform to variations in the lateral movement of the backing 2. The member 116 is guided by means of lugs or guides 122 on the side frames and retained in such a position that the edge of the bottom 117 of the composition chamber 119 is adjacent the roller 54 and provides sufficient clearance to allow the backing strip to pass between the bottom portion 117 and the roller and over the top of the roller to the shelf 56. A thin sheet metal spring guide or scraper member 123 is secured to the shelf 56 and is in contact with the roller 54 to provide a tangent surface for the smooth removal of the backing from the roller.

The end walls of the chamber 119 comprise adjustable plates 124 which conform to the contour of the roller 54 and the interior of movable member 116. These end wall plates are provided with lugs 125 arranged to overhang the wall 118 and to be adjustably secured thereto by means of set screws 126. It will be obvious that these end plates 124 may be moved laterally and secured in any desired position to provide a composition chamber conforming to the width of strip which is to be coated. The end plates are provided with slots 127, 128 and 129 for the purpose of receiving and supporting therein a stationary doctor bar 130 and suitable partitions 131 and 132 respectively, as shown in Fig. 14.

The stationary doctor bar 130 is supported in spaced relation to the roller 54 to provide a desired thickness of composition flowing thereunder onto the backing. A movable gate 133 is slidably supported between guide pins 134 and the stationary doctor bar 130. These bars and partitions may be of a desired length corresponding to the width of the strip to be coated and the end wall plates 124 will be positioned accordingly.

A roller 135 is mounted in the end plates 124 and adjacent the roller 54. This roller is held in contact with the backing by means of a spring 136. The object of this roller is to press a preliminary coating of the composition against the adhesive on the backing to assure that the composition will securely adhere thereto. The end walls 124 may be notched or cut away slightly as shown at 124a in order to receive and guide the edges of the backing strip.

As previously stated, the duplicating composition which is contained in the tank 71 is continuously fed to the chamber 119 through the flexible tube 72 and through an opening 137 provided in the bottom plate 117. The conduit 72 is removably supported adjacent the opening by means of a flange 138 which is slidably mounted in slots 139.

While in the present instance I have shown only one set of end wall plates 124 to provide a single applying chamber 119, it will be obvious that a plurality of end plates may be used if desired to provide a plurality of applying chambers and that it is only necessary to provide suitable conduit connections for each chamber; for instance by the use of a plurality of chambers, strips of different widths may be coated at the same time and by the same mechanism.

It is desirable that an even flow and pressure of the composition be maintained in the chamber 119. The partitions 131 and 132 are therefore provided whereby the composition flows from the conduit 72 upwardly and over the partition 132, its passage over this partition tending to break any bubbles which may be formed in the composition. The composition then flows under the partition 131 and adjacent the doctor bar under which it is applied to the backing. This arrangement of partitions maintains the surface of the material adjacent the doctor bar comparatively level and prevents variations in pressure along the length of the doctor bar. In order to further spread the material as it enters the chamber and to cause an even flow, a baffle member 140 is provided to distribute the flow of composition evenly over the length of the chamber.

In order to control the flow of the composition to coat only alternate portions of the strip to a desired length and to leave therebetween uncoated portions to provide aprons for securing the strip to the duplicator spindles, the gate 133 is slidably mounted between the doctor bar 130 and the pins 134 and supported on suitable cam slides 141 which are slidably mounted on the end plates 124 by means of screws 142 in slots 143. These cam slides 141 are provided with downwardly extending pins 144 arranged to be engaged by arms 145 which are adjustably mounted on a rock shaft 146 mounted in the side frames of the machine.

With the rock shaft 146 in the position shown in Figs. 12 and 14 the outwardly extending arms 133a of the movable doctor bar 133 will be supported on cam surfaces 141a of the cam slides and the gate will remain raised as shown in Fig. 14 to allow the composition to pass under the doctor bar 130. When the rock shaft 146 is oscillated to bring the arms 145 into operative relation with the opposite one of the pins 144 the cam slides will move in the opposite direction and allow the gate to be moved downwardly by means of springs 147 which are attached to the arms 133a.

The movement of the rock shaft is so controlled that the gate 133 will be moved downwardly until it presses against the backing during which time no composition will be applied thereto. The operation of the rock shaft may be automatically controlled by means which will be described later, to provide any desired length and spacing of the applied composition. It is necessary that the flow of composition to the chamber 119 should be stopped simultaneously with the closing of the gate 133. This is accomplished by means of a slide valve 148 which is operated by a lever 149 pivoted on the back wall 118 of the chamber.

A rod 150 is engaged in a slot 151 in the lever and supported on the rock shaft 146 by means of adjustable collars 152. It will be obvious that when the rock shaft 146 is rotated in a direction to close the gate 133 the rod and slot connection will move the lever 149 to close the valve member 148 and that when the rock shaft is moved in the opposite direction to open the gate the valve will simultaneously be opened.

The composition chamber end plates 124 may be notched or cut away to provide a groove 124a, (Figs. 15 and 16). The backing strip runs over the roller 54 and the edges are covered by the slight overhang of the end plates provided by the groove. This overlapping of the strip by the end plates prevents the composition from flowing directly onto the extreme edge of the backing and then spreading over the edge before it "sets".

It has been found desirable to supply a slightly greater flow of composition at the extreme ends of the doctor bar in order to allow the composition to spread evenly to the extreme edge of the strip and to "set" at the same thickness as at intermediate points. This has been accomplished, therefore, by angularly relieving the outer corners of the doctor bar 130 as shown at 130a, Fig. 12A.

Figure 18:
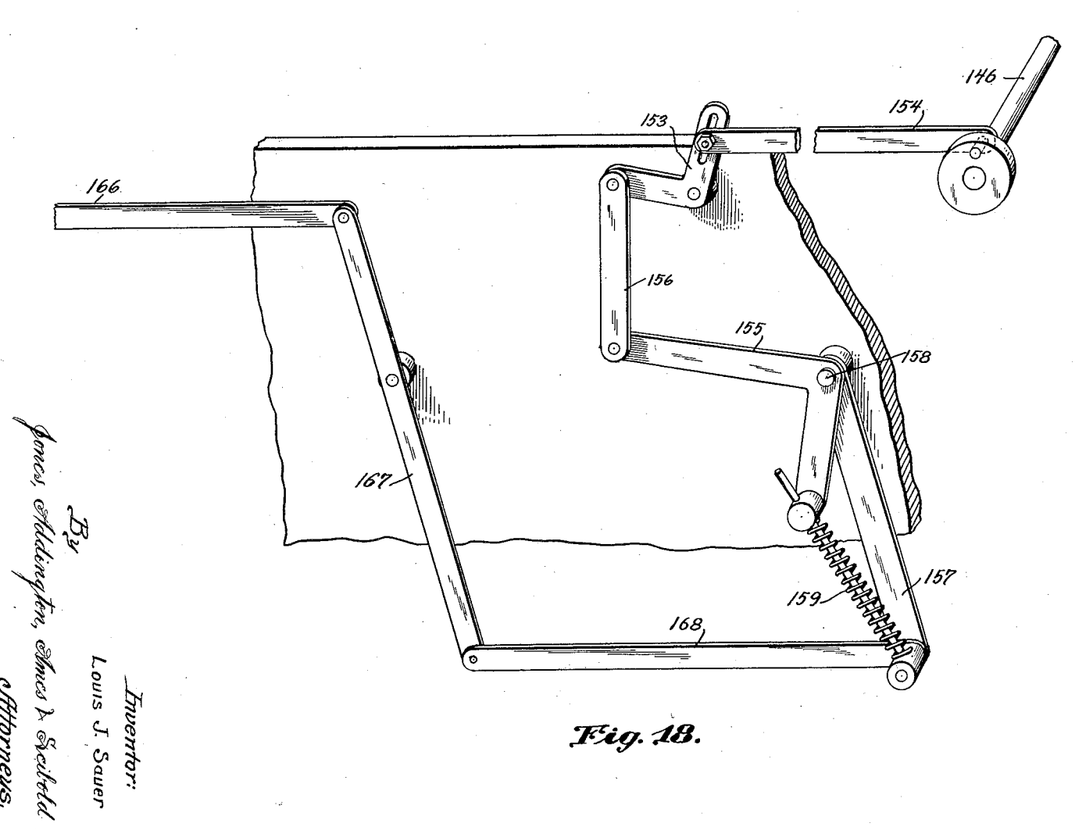
Fig. 18 is a perspective view of the toggle joint arrangement for controlling the operation of the adhesive applying doctor bar or gate.

In order that the operation of the rock shaft may be automatically controlled to close and open the gate at predetermined time intervals a toggle joint connection is connected thereto which is illustrated in Fig. 18 in which the rock shaft 146 is connected to a bell crank 153 by means of a link 154. The operation of this bell crank will oscillate the rock shaft 146 and the bolt and slot connection of the link 154 to the bell crank allows the throw of the rock shaft to be adjusted to provide any desired movement of the gate 133. The bell crank 153 is connected to a toggle joint bell crank 155 by a link 156. A lever 157 is pivoted with the bell crank at 158 and a spring 159 provides a suitable resilient connection between the lever 157 and the bell crank 155. It will be obvious that as the lever 157 is moved from one side to the other the toggle joint arrangement will oscillate the rock shaft 146 accordingly.

Figure 19:
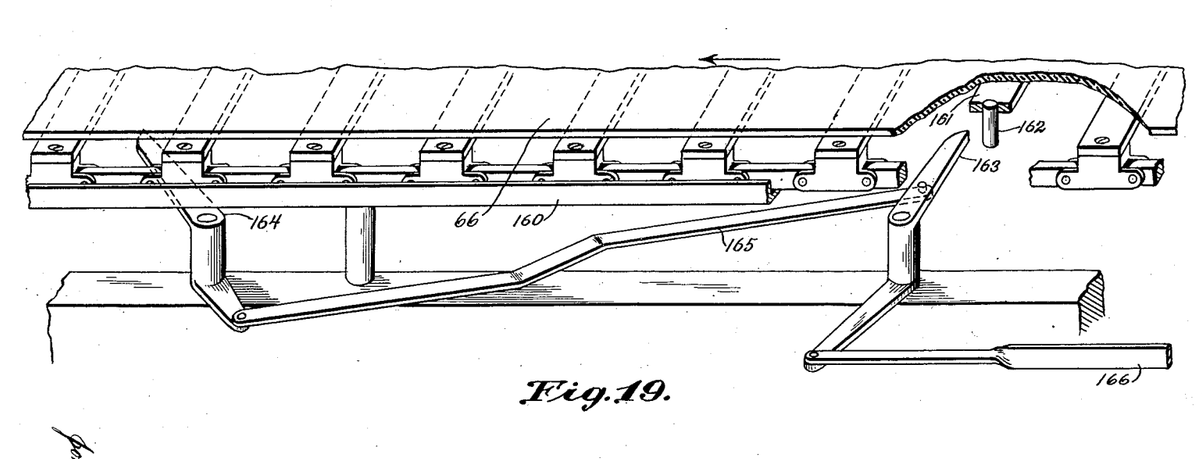
Fig. 19 is a detailed perspective view of a portion of the conveyor and the trip means for controlling the operation of the toggle joint illustrated in Fig. 18.

In order to automatically operate the lever 157 from the conveyor 67, which is shown in detail in Fig. 19, and which comprises conveyor chains supported in suitable U-bar tracks 160, the conveyor is provided with cross bars 161 secured to the chains and over which the rubber belt 66 is stretched. Downwardly extending pins 162 are secured to these bars in spaced relation corresponding to the length of the alternate surfaces desired to be coated with composition. Trip levers 163 and 164 are pivotally mounted on the frame of the machine and connected together by means of a link 165. The lever 163 is connected to the toggle lever 157 by means of a link 166, a pivoted lever 167 and a link 168. It is obvious that during the movement of the conveyor in the direction of the arrow and as the strip is being carried thereon one of the pins 162 will engage the lever 163 and the toggle joint will be operated to cause the gate 133 to be closed and prevent the application of the composition to the backing. The movement of the lever 163 will simultaneously cause the lever 164 to be moved into the path of the pin 162 and be engaged thereby and the lever 164 will then be operated to reverse the position of the toggle joint and open the gate and thereby again applying the composition. The trip levers 163 and 164 may be arranged in any desired spaced relation and the position of the pins 162 on the conveyor and the spaced relation of the levers may be arranged to provide any desired length of uncoated backing relative to any desired length of coated backing and thereafter during the further movement of the conveyor the backing may be cut through the uncoated portion to provide the desired duplicator sheets each having a suitable length of uncoated apron for attachment to spindle.

In some instances it is desirable to use the gate 133 as a combination gate and doctor bar. To accomplish this result the doctor bar 130 is removed and short guide plates inserted in the slots 127 for the purpose of guiding the gate 133. The rock shaft control is then adjusted to raise the combination gate and doctor bar to provide for the passage of a suitable amount of composition thereunder.

I have found in practice that an impregnating material made up in the following proportions gives satisfactory results:

|  | Per cent |
| --- | --- |
| 10—10 glue | 9.5 |
| Water | 22.3 |
| 95% glycerine | 64.7 |
| Nekal A | 3.5 |

I have secured satisfactory results using this mixture at a temperature of 140° F., the strip or web being immersed in the impregnating material for a period of from one to three minutes.

I have found in practice that a waterproof lacquer of the following composition gives satisfactory results:

|  | Per cent |
| --- | --- |
| Half second cotton | 15 |
| Castor oil | 17.5 |
| Di-butyl phthalate | 4.5 |
| Ethyl acetate | 63 |

I have secured satisfactory results using this lacquer at a temperature of from 90° to 100° F.; the strip or web being immersed in the lacquer for a period of about one minute.

I have found in practice that an adhesive of the following composition gives satisfactory results:

|  | Per cent |
| --- | --- |
| Pearl glue 13—15 | 14.5 |
| 75% Turkey red oil | 15.5 |
| Cellosolve | 14 |
| Completely denatured No. 1 alcohol | 22.5 |
| Water | 33.5 |

I have obtained satisfactory results using this adhesive at room temperature.

I have found in practice that satisfactory results are obtained using a hectograph composition of the following proportions at a temperature of about 130° F.:

10 lbs. glue 10—10 grade
25 lbs. water
65 lbs. glycerine
Suitable pigment, as zinc sulphide
.045 per cent formaldehyde
Sufficient caustic soda to give a pH of about 8.5.

This hectograph composition can be applied even in hot weather because of the use of the formaldehyde in the composition and the immediate chilling of the composition after its application.

It should be especially noted that the means and method herein disclosed makes possible the quantity production of duplicator sheets with a speed and accuracy heretofore unattained. The uniform thickness of the finished sheet and smoothness of the surface of the composition is especially noticeable.

While only one embodiment of my invention has been shown and described it is obvious that modifications may be made without departing from the spirit of the invention, and therefore I desire to be limited only by the prior art and the appended claims.

Having thus described my invention, what I claim and desire to secure by Letters Patent is:

1. The method of manufacturing composition coated strips comprising passing the strip through an impregnating solution to which lacquer will adhere, squeezing the surplus solution from the strip, simultaneously heating and smoothing both sides of the strip by pressure, passing the heated strip through a lacquer solution to coat both sides, simultaneously smoothing the lacquer on both sides to a predetermined thickness, drying the strip, applying an adhesive to the lacquer, and applying a composition to the adhesive while maintaining the strip at substantially the temperature of the applied composition.

2. The method of manufacturing duplicating sheets comprising running a sheet of flexible backing through impregnating material consisting substantially of glue, glycerine and water retained at a temperature of approximately 140° F. then simultaneously heating, drying and smoothing the impregnated sheet to prevent buckling, then running the sheet through lacquer at a temperature of approximately 130° F. to completely coat both sides, then oven drying the sheet at approximately 200° F. and simultaneously eliminating the volatiles, then trimming the sheet to a desired width, then coating one side only of the lacquered sheet with an adhesive composition which will adhere to the lacquer and to a gelatine-glue composition to be later applied, then drying the adhesive at a temperature of approximately 160°, then applying a gelatine-glue composition to the adhesive, then chilling sufficiently to obtain a preliminary "set", then storing in a temperature approximately 68° F. until "set" sufficiently to be wound on spindles.

3. In a coating machine of the character described the combination with an impregnating means and a lacquering means, of means for progressively increasing the temperature of a backing strip in its movement from the impregnating means to the lacquering means, said temperature increasing means comprising a plurality of successively contacting devices, of successively varying temperature for simultaneously smoothing and drying the strip by pressure.

4. In a coating machine of the character described the combination with an impregnating means and a lacquering means, of means for progressively increasing the temperature of a backing strip in its movement from the impregnating means to the lacquering means, said temperature increasing means comprising a plurality of successively contacting devices, of successively varying temperature for simultaneously smoothing and drying the strip by pressure, and means for automatically controlling the progressive temperatures.

5. In a coating machine of the character described, the combination with a backing impregnating means and a backing lacquering means, of means for continuously moving a backing in a manner to be first impregnated and then dried, and heated rollers between said impregnating means and said lacquering means and arranged for pressure contact with both sides of said backing.

6. In a coating machine of the character described, the combination with a backing impregnating means and a backing lacquering means, of means for continuously moving a backing in a manner to be first impregnated and then dried, and heated rollers between said impregnating means and said lacquering means and arranged for pressure contact with both sides of said backing, and automatic means for controlling the temperature of individual rollers.

7. The method of manufacturing duplicator sheets by successive operations on a continuously moving unsized backing strip comprising first impregnating with a thin glue-glycerine-water solution, then coating the strip on both sides with lacquer, while smoothing and heating the strip by surface conduction at a progressively increasing temperature between the solution and the lacquer, and thereafter applying a duplicating composition to the strip.

8. The method of manufacturing duplicator sheets by successive operations on a continuously moving unsized backing strip comprising first impregnating with a thin glue-glycerine-water solution, then coating the strip on both sides with lacquer, while smoothing and heating the strip by surface conduction at a progressively increasing temperature between the solution and the lacquer, then applying an adhesive to the lacquered strip, and then applying a duplicating composition to the strip.

9. The method of manufacturing duplicator sheets by successive operations on a continuously moving unsized backing strip comprising passing the backing strip through a thin glue-glycerine-water solution, then squeezing the strip, then heating by pressure contact with heated surfaces, then passing through a lacquer, then through a drying temperature, then through a hectograph duplicating composition in a manner to apply a uniform coating, and then through a chilling temperature.

10. The method of manufacturing duplicator sheets by successive operations on a continuously moving strip of unsized paper comprising first passing the strip through a thin glue-glycerine-water impregnating solution, then applying heat by surface conduction in a manner to simultaneously dry and smooth the surface, then applying lacquer to both sides while the strip is still hot, then drying the strip by radiation, again heating the strip by surface conduction, applying a second coat of lacquer while the strip is still hot, then again heating the strip, then applying an adhesive to one side only, then heating the strip by conduction through the uncoated side, then pressing a thin, preliminary coat of duplicating composition on said adhesive and immediately thereafter applying a comparatively thick coat of the same composition, then chilling the composition.

11. In an apparatus for the manufacture of duplicator sheets in continuous strips, means for continuously moving a strip of unsized backing material, and, in consecutive order, means for impregnating said strip with glue-glycerine-water solution, means for simultaneously smoothing and heating the surface of said strip by contact of a heated surface therewith, means for applying a waterproof coating, means for drying said strip by radiation, means for applying an adhesive, and means for applying a comparatively thick and uniform coating of hectographic duplicating composition.

12. In an apparatus for the manufacture of duplicator sheets in strips, means for continuously moving a strip of unsized backing material, and, in consecutive order, means for impregnating said strip with glue-glycerine-water solution, means comprising consecutive heating surfaces contacting with said strip for simultaneously smoothing and heating the surface of said strip, means for applying a waterproof coating, means for drying said strip by radiation, means for applying an adhesive to said strip, and means for applying a comparatively thick and uniform coating of hectographic duplicating composition to said adhesive.

13. In an apparatus for the manufacture of duplicator sheets in strips, means for continuously moving a strip of unsized backing material, and, in consecutive order, means for impregnating said strip with glue-glycerine-water solution, means for simultaneously smoothing and heating the surface of said strip, said smoothing and heating means comprising heated rollers in consecutive contact with said strip, means for applying a waterproof coating, means for drying said strip by radiation, means for applying an adhesive to said strip, and means for applying a comparatively thick and uniform coating of hectographic duplicating composition to said adhesive.

14. In an apparatus for the manufacture of duplicator sheets in continuous strips, means for continuously moving a strip of unsized backing material, and, in consecutive order, means for impregnating said strip with glue-glycerine-water solution, means for simultaneously smoothing and heating said strip, said smoothing and heating means comprising a series of heated rollers of progressively increasing temperature, means for applying a waterproof coating, means for drying said strip by radiation, means for applying an adhesive to said strip, and means for applying a comparatively thick and uniform coating of hectographic duplicating composition to said adhesive.

LOUIS J. SAUER.